United States Patent
Garry (10) Patent No.: US 11,399,508 B2
(45) Date of Patent: Aug. 2, 2022

(54) ANIMAL ENRICHMENT TOOL

(71) Applicant: Cynthia Garry, Dillsburg, PA (US)

(72) Inventor: Cynthia Garry, Dillsburg, PA (US)

(73) Assignee: Cynthia Garry, Dillsburg, PA (US)

( * ) Notice: Subject to any disclaimer, the term of this patent is extended or adjusted under 35 U.S.C. 154(b) by 494 days.

(21) Appl. No.: 16/418,503

(22) Filed: May 21, 2019

(65) Prior Publication Data
US 2019/0350171 A1 Nov. 21, 2019

Related U.S. Application Data (60) Provisional application No. 62/674,271, filed on May 21, 2018.

(51) Int. Cl.
*A01K 15/02* (2006.01)

(52) U.S. Cl.
CPC .................. *A01K 15/02* (2013.01)

(58) Field of Classification Search
CPC ...... A01K 15/02; A01K 13/00; A01K 13/002; A01K 13/001; A61H 7/002; A61H 7/003; A46B 5/0016; A46B 2200/10; A46B 2200/1093; A46B 2200/102; A46B 9/02; A46B 9/005; A46B 9/028; A46B 15/0075; A46B 5/02; A46B 5/021; A46B 5/026

See application file for complete search history.

(56) References Cited

U.S. PATENT DOCUMENTS

| | | | | |
|---|---|---|---|---|
| 1,914,240 A * | 6/1933 | Caldwell | A46B 5/002 | 15/167.1 |
| 2,084,873 A * | 6/1937 | Strauselouisj | A46B 9/026 | 15/167.1 |
| 2,095,741 A * | 10/1937 | Hachman | A46B 5/0016 | 15/176.6 |
| 4,150,457 A * | 4/1979 | Larson | A46B 5/0016 | 15/106 |
| 4,524,478 A * | 6/1985 | Ross | A46B 5/0016 | 15/106 |
| 4,543,679 A * | 10/1985 | Rosofsky | A46B 5/0016 | 15/104.92 |
| 4,679,272 A * | 7/1987 | Florence | A46B 7/04 | 15/106 |
| 4,738,001 A * | 4/1988 | Shipp | A01K 13/00 | 15/106 |
| 5,065,470 A * | 11/1991 | Diamond | A46B 9/04 | 15/106 |
| 5,758,380 A * | 6/1998 | Vrignaud | A46B 5/0012 | 15/106 |
| 5,842,247 A * | 12/1998 | Decesare | A46B 5/0016 | 15/106 |
| 5,934,762 A * | 8/1999 | Vrignaud | A46B 5/02 | 300/21 |
| 6,170,111 B1 * | 1/2001 | Rueb | A46B 5/0016 | 15/106 |

(Continued)

FOREIGN PATENT DOCUMENTS

KR 2018044446 * 5/2018

*Primary Examiner* — Trinh T Nguyen
(74) *Attorney, Agent, or Firm* — Barley Snyder (57) ABSTRACT

An animal enrichment tool is provided and includes a shaped frame, a first sensory head positioned at one end of the shaped frame, and a second sensory head positioned at another end of the shaped frame.

13 Claims, 7 Drawing Sheets

(56) References Cited

U.S. PATENT DOCUMENTS

| | | | | |
|---|---|---|---|---|
| 6,546,583 B1* | 4/2003 | Rohrig | ............... | A46B 5/02 |
| | | | | 15/110 |
| 8,621,701 B2* | 1/2014 | Meharry | ............ | A46B 5/0095 |
| | | | | 15/106 |
| 2012/0054974 A1* | 3/2012 | Hurwitz | ............ | A46B 9/04 |
| | | | | 15/167.1 |
| 2018/0049844 A1* | 2/2018 | Dericco | ............ | A46B 5/0016 |

\* cited by examiner

ANIMAL ENRICHMENT TOOL

CROSS-REFERENCE TO RELATED APPLICATION

This application claims priority under 35 U.S.C. § 119 to U.S. Provisional Patent Application No. 62/674,271 filed May 21, 2018.

FIELD OF THE INVENTION

The invention relates to tool for animals, and in particular, tools for animals that involve animal enrichment, and more particularly, a tool that promotes for an animal, such as a horse or dog, optimal psychological and physiological well-being during training.

BACKGROUND

Animal enrichment is a husbandry principle that seeks to enhance the quality of captive animal care by identifying and providing the stimuli necessary for optimal psychological and physiological well-being.

The most common form of human-interaction enrichment is training. The human and animal interaction during training builds trust, and increases the animal's cooperation, and has been shown to benefit the welfare of that animal. Since an animal's behavior may relate to a sensory issue during stress, such over-responsiveness to sensory touch, there is a need for a tool that provides calmness and trust during training.

SUMMARY

In view of the aforementioned need, an animal enrichment tool according to the invention is provided.

The animal enrichment tool generally includes a shaped frame, a first sensory head positioned at one end of the shaped frame, and a second sensory head positioned at another end of the shaped frame.

BRIEF DESCRIPTION OF THE DRAWINGS

The invention will be explained in greater detail with reference to embodiments, referring to the appended drawings, in which.

DETAILED DESCRIPTION OF THE EMBODIMENT(S)

Now with reference to the Figures, an animal enrichment tool 1 according to the invention will be described.

Figure 1:
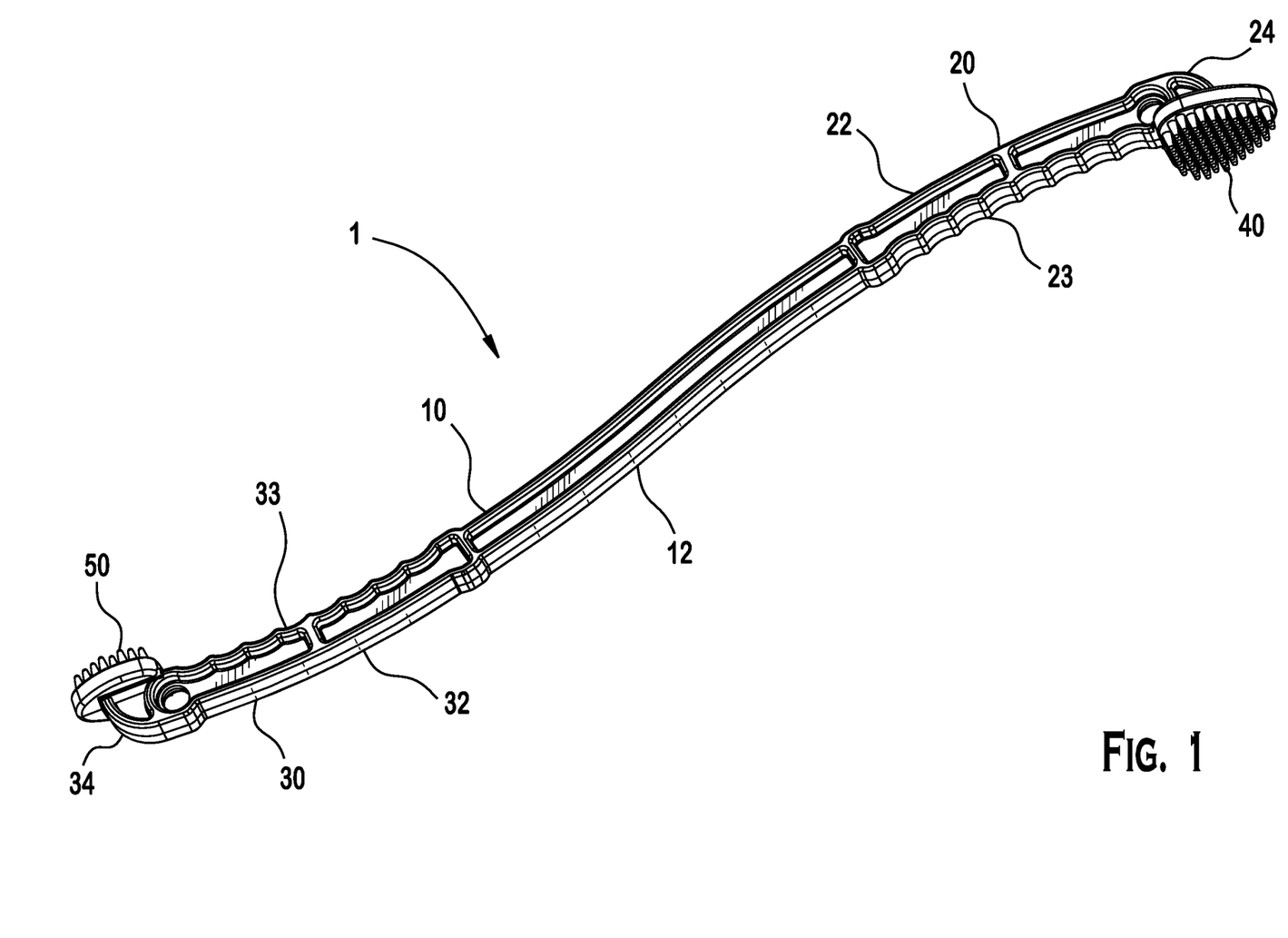
FIG. 1 is a front perspective view of an animal enrichment tool according to the invention.
Figure 2:
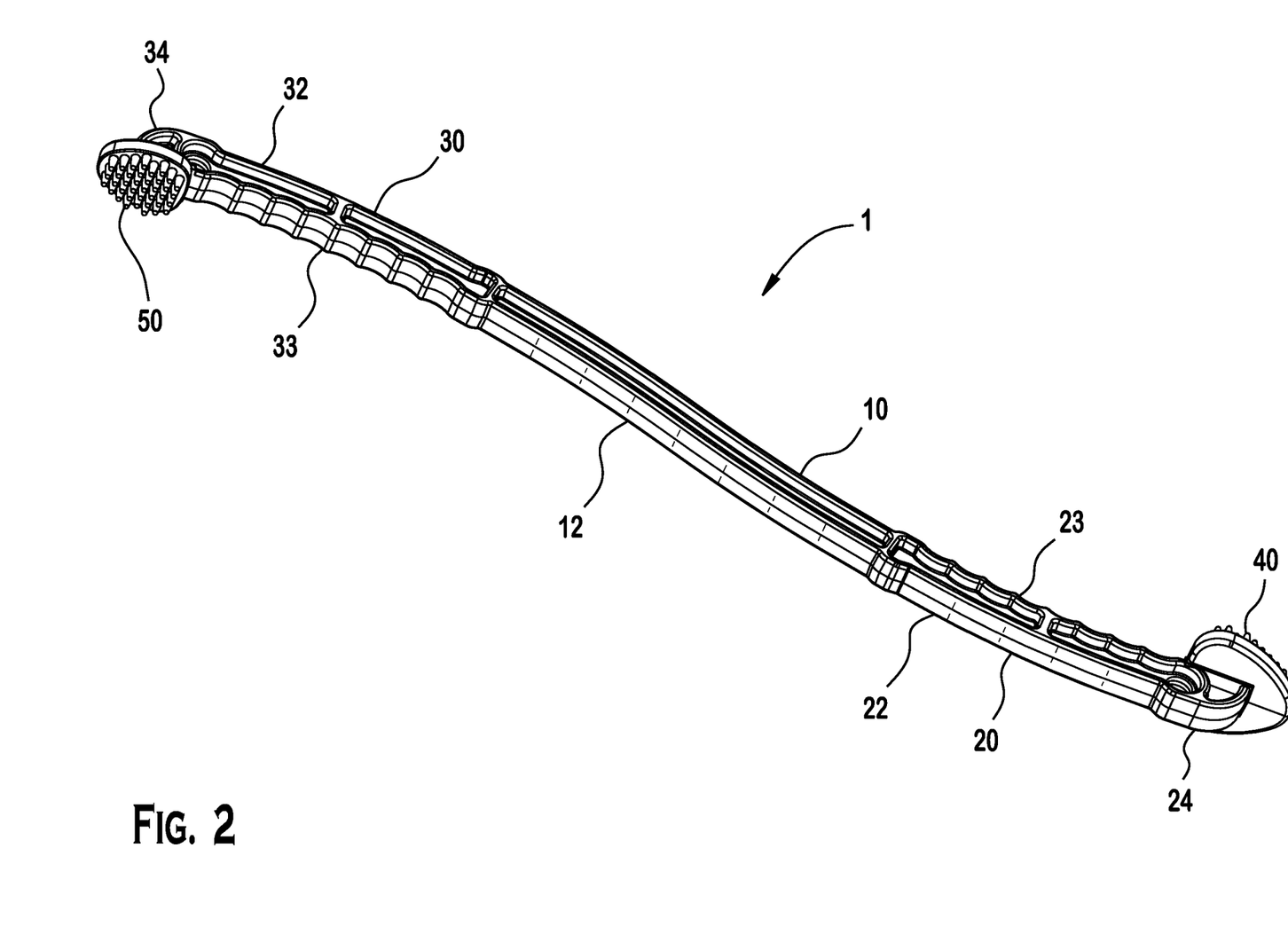
FIG. 2 is a rear perspective view of the animal enrichment tool of FIG. 1.

As shown in FIGS. 1 and 2, an animal enrichment tool 1 generally includes a uniquely-shaped frame 10 and pair of sensory heads 40 and 50.

Figure 3:
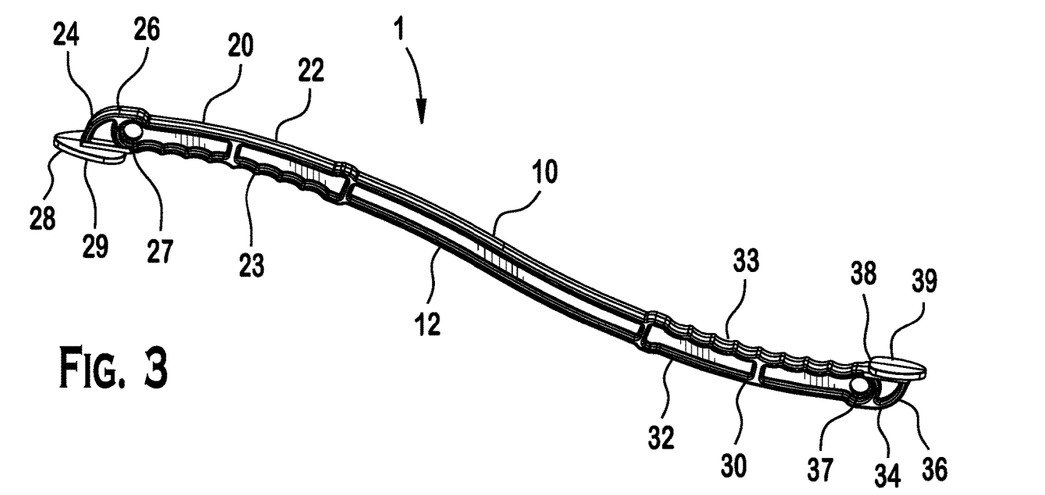
FIG. 3 is rear perspective view of a frame of an animal enrichment tool according to the invention.

As shown in FIG. 3, the frame 10 is an elongated, monolithic body. In an exemplary embodiment, the frame 10 is made from a single piece of molded plastic. In one embodiment, the frame 10 is made from fiber impregnated plastic. However, one skilled in the art should appreciate that the frame could be made from a variety of known materials, including but not limited to thermoplastics and thermosets.

Figures 4, 5:
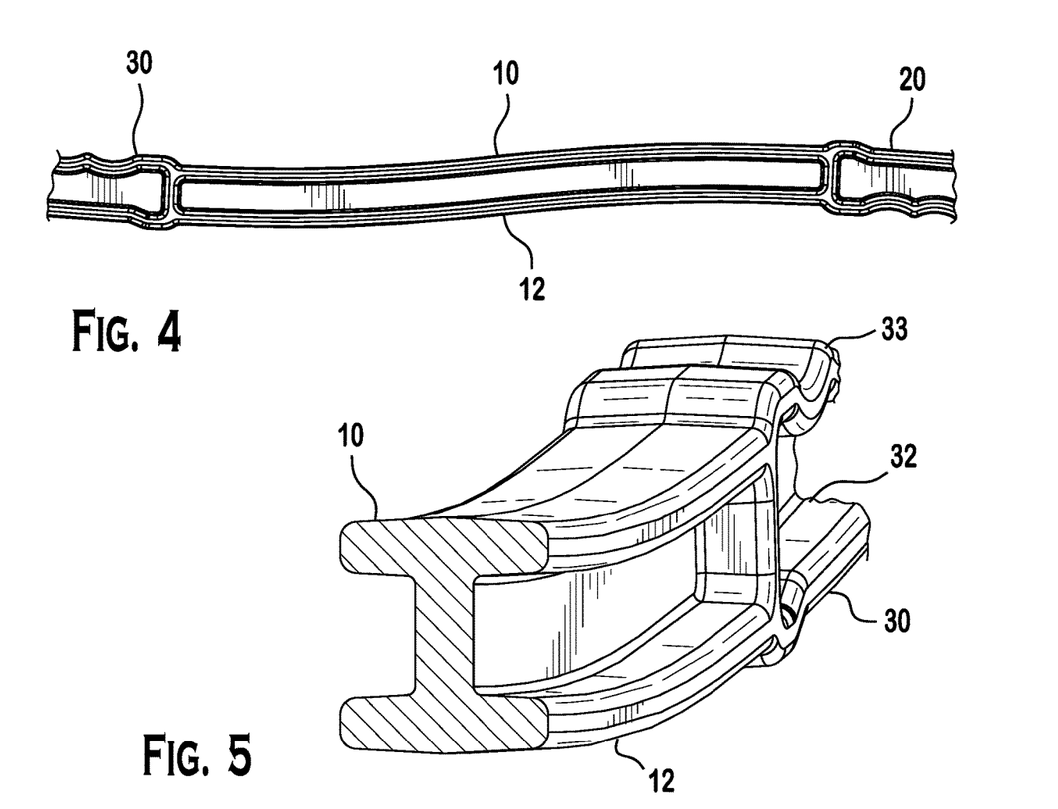
FIG. 4 is a front view of a bridge section of frame body of FIG. 3.
FIG. 5 is a sectional view of the frame of FIG. 3.
Figure 6:
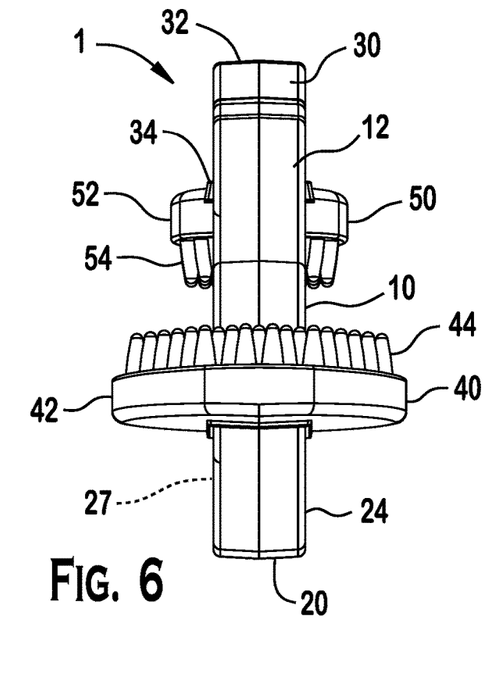
FIG. 6 is a front view of first end section of the frame according to the invention, showing a first sensory head attached thereto.

According to the invention, the frame 10 generally includes three sections: (1) a bridge section 12, (2) a first end section 20, (3) and a second end section 30. As shown in FIG. 3, in an exemplary embodiment, the frame 10 is s-shaped. The first end section 20 and the second end section 30 extend from opposite sides of the bridge section 12. As shown in FIG. 4, the frame 10 may include an I-beam cross section. This is provided for rigidity and structural integrity, as well as improved dexterity and precise handling of the animal enrichment tool 1.

With reference to FIG. 5, the bridge section 12 is shown. In an exemplary embodiment of the invention, the bridge section 12 is elongated body having a wave shape like shape, whereby opposite ends curve away from each other. In the shown embodiment, the bridge section 12 is sloped and connects first end section 20 and the second end section 30. The length of bridge section 12 may vary and be dependent on the intended use of the animal enrichment tool 1. As a result, a shorter or longer bridge section 12 may be provided and designed for its intended use with smaller or larger animals.

Next, with reference to FIGS. 6-9, the first end section 20 will be described. However, in FIG. 6, a first sensory head 40 is shown, while FIGS. 7-9 omit the first sensory head 40 to illustrate structure of the first end section 20.

In an exemplary embodiment, the first end section 20 is also elongated body and a generally includes a first handle section 22 and a first head support section 24. As shown, the first end section 20 generally has an arcuate shape that matches the shape of an end of the bridge section 12 to which it extends. As a results, the first end section 20 further emphasizes a s-shaped pattern of the frame 10.

The first handle section 22 is elongated body having an arcuate shape. The first handle section 22 generally includes a plurality of grips 23 to facilitate dexterity and improve precise handling of the animal enrichment tool 1. In the shown embodiment, the grips 23 are indentations along an inner surface of the first handle section 22, as well as ridges that are formed from the I-beam construction of the frame 10.

Figure 7:
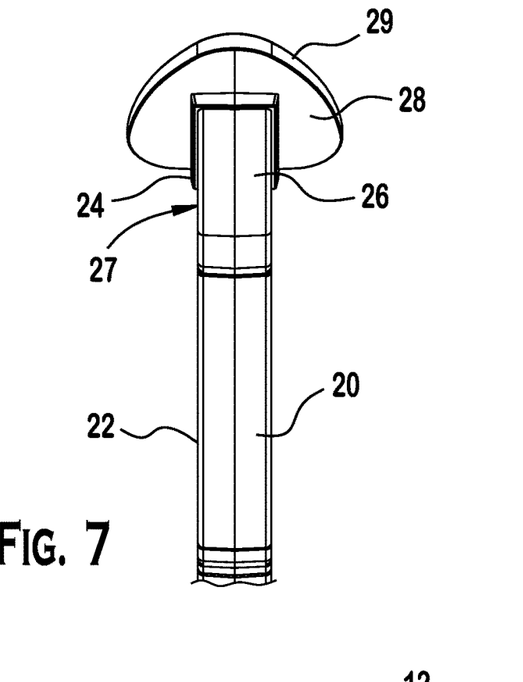
FIG. 7 is a top view of the first end section of FIG. 6, shown without the first sensory head.
Figure 8:
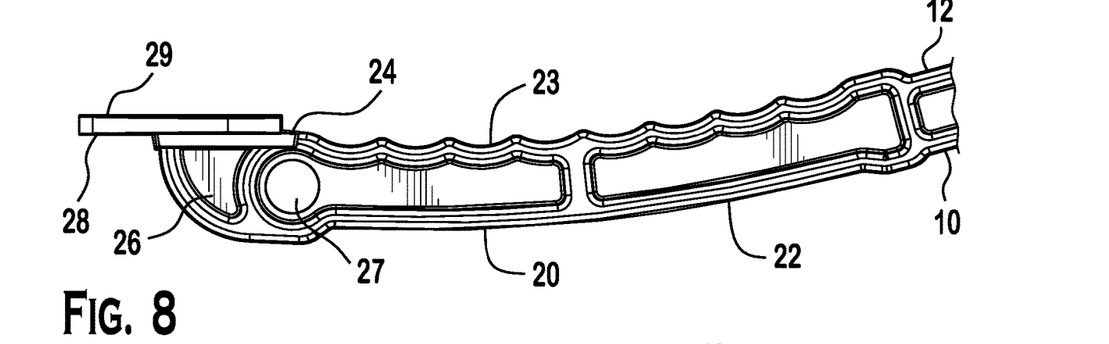
FIG. 8 is a side view of the first end section of FIG. 6.
Figure 9:
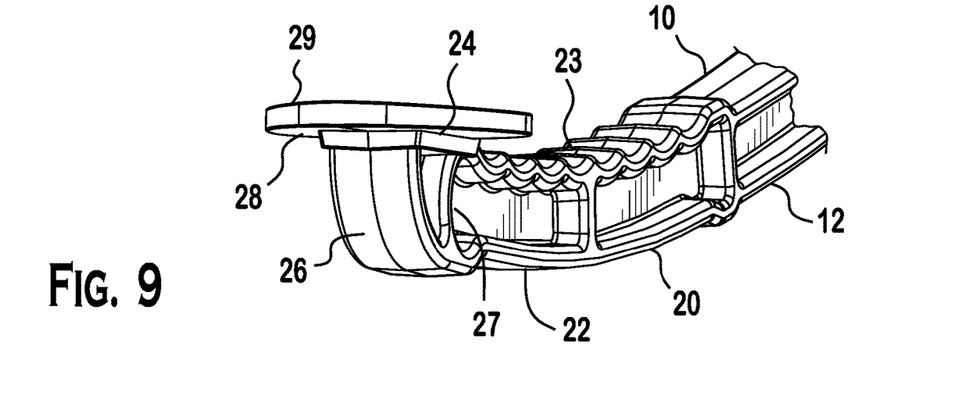
FIG. 9 is a perspective view of the first end section of FIG. 6.
Figure 10:
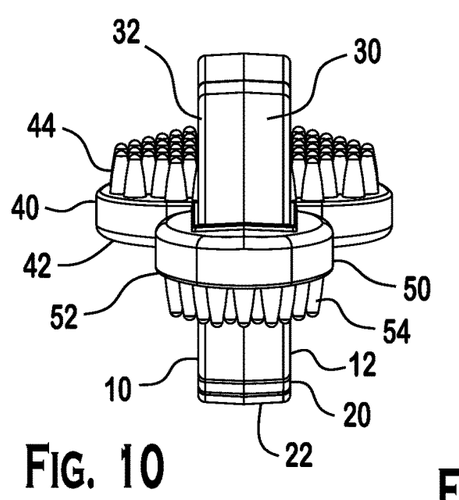
FIG. 10 is a front view of second end section of the frame according to the invention, showing a second sensory head attached thereto.

As shown in the FIGS. 8 and 9, first head support section 24 generally includes a first connector section 26 and first head support 28. The first connector section 26 is extends from the first handle section 22 and includes a first hanger receiving passageway 27 extending there through. The first head support 28 is a planar member having a first planar surface 29 facing upward and angled to correspond with the curved profile of the of the first end section 20. As shown in FIG. 7, the first head support 28 has a triangular shape and is formed into a polygon. However, one skilled in the art should appreciate that other shaped may be suitable for the intended use of the animal enrichment tool 1.

Next, with reference to FIGS. 10-13, the second end section 30 will be described. However, in FIG. 10, a second sensory head 50 is shown, while FIGS. 11-13 omit the second sensory head 50 to illustrate structure of the second end section 30.

In an exemplary embodiment, the second end section 30 is also elongated body and a generally includes a second handle section 32 and a second head support section 34. As shown, the second end section 30 generally has an arcuate shape that matches the shape of an end of the bridge section 12 to which it extends. As a results, the second end section 30 further emphasizes a s-shaped pattern of the frame 10.

The second handle section 32 is elongated body having an arcuate shape. The second handle section 32 generally includes a plurality of grips 33 to facilitate dexterity and improve precise handling of the animal enrichment tool 1. In the shown embodiment, the grips 33 are indentations along an inner surface of the second handle section 32, as well as ridges that are formed from the I-beam construction of the frame 10.

Figure 11:
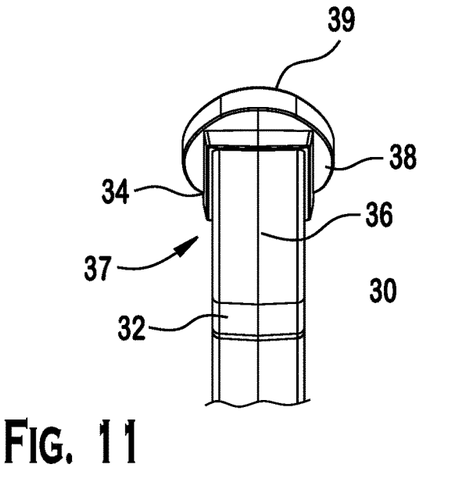
FIG. 11 is a top view of the second end section of FIG. 10, shown without the second sensory head.
Figure 12:
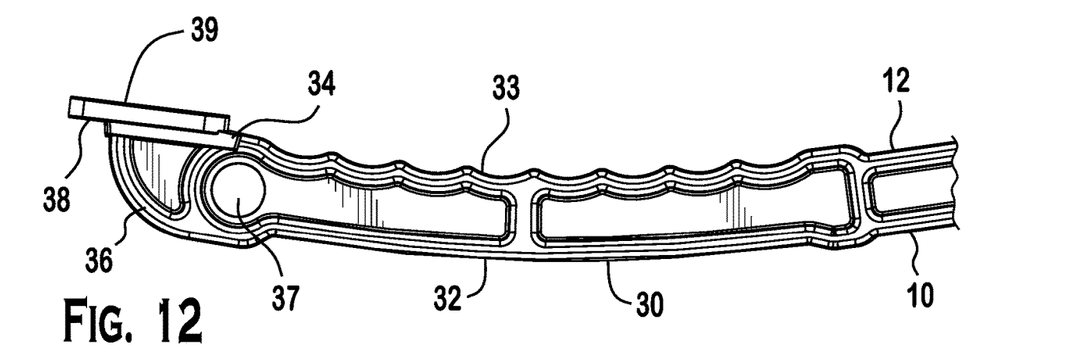
FIG. 12 is a side view of the second end section of FIG. 10.
Figure 13:
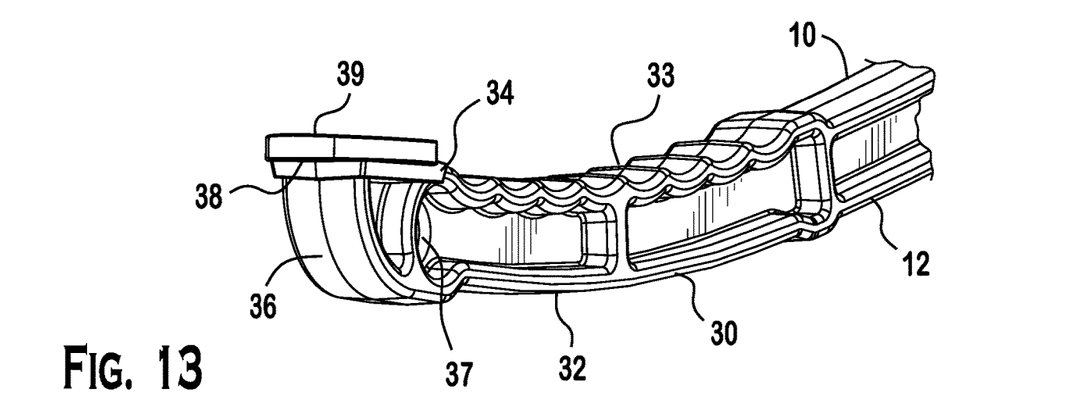
FIG. 13 is a perspective view of the first end section of FIG. 10.
Figures 14, 15, 16, 17:
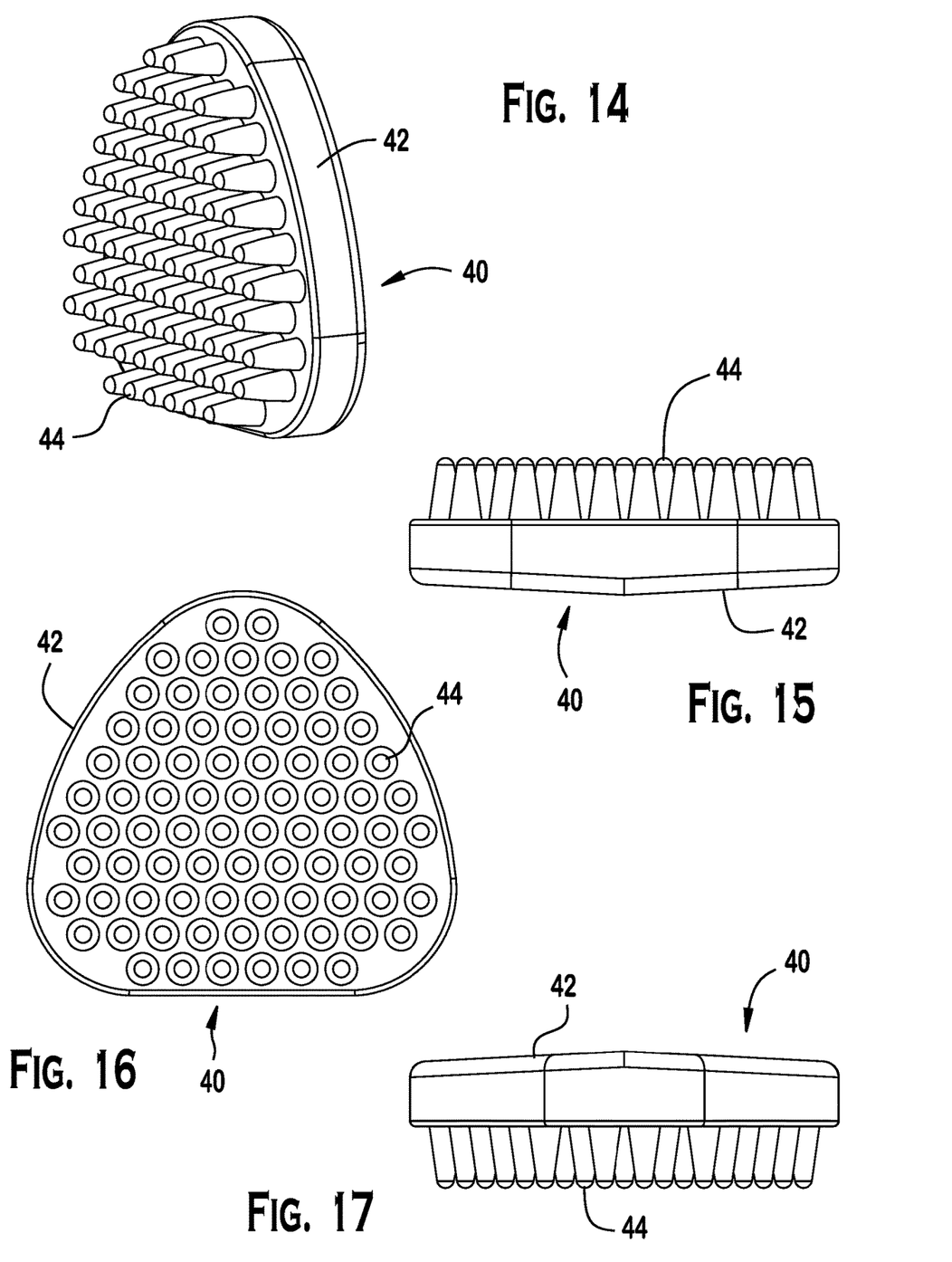
FIG. 14 is a perspective view of a first sensory head an animal enrichment tool according to the invention.
FIG. 15 is a rear view of the first sensory head of FIG. 14.
FIG. 16 is a bottom view of the first sensory head of FIG. 14.
FIG. 17 is a front view of the first sensory head of FIG. 14.
Figures 18, 19, 20, 21:
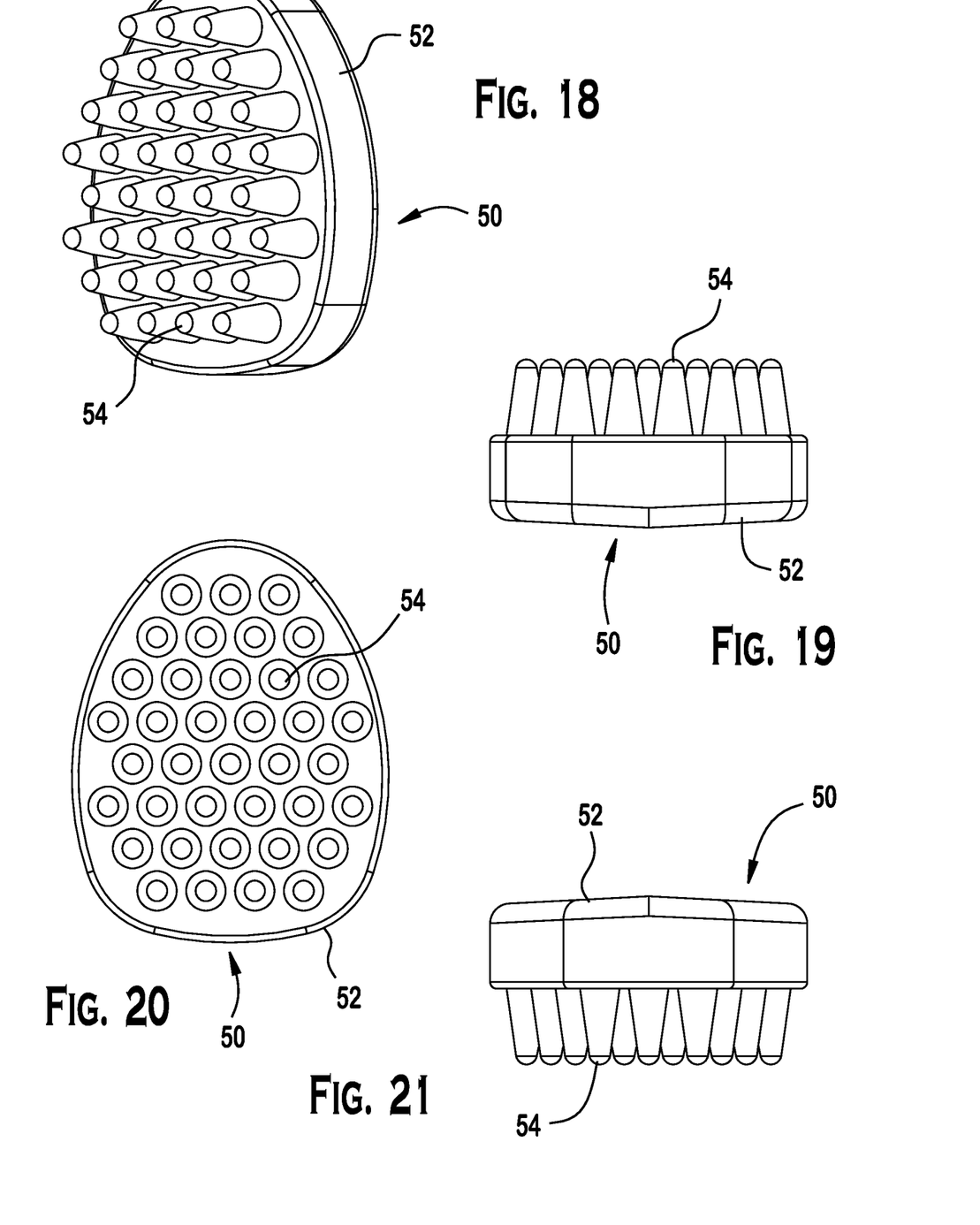
FIG. 18 is a perspective view of a second sensory head an animal enrichment tool according to the invention.
FIG. 19 is a rear view of the second sensory head of FIG. 18.
FIG. 20 is a bottom view of the second sensory head of FIG. 18.
FIG. 21 is a front view of the second sensory head of FIG. 18.

As shown in the FIGS. 12 and 13, the second head support section 34 generally includes a second connector section 36 and second head support 38. The second connector section 36 is extends from the second handle section 32 and includes a second hanger receiving passageway 37 extending there through. The second head support 38 is a planar member having a second planar surface 39 facing upward and angled to correspond with the curved profile of the of the second end section 30. As shown in FIG. 11, the second head support 38 has an oval type shape and formed as a polygon. However, one skilled in the art should appreciate that other shaped may be suitable for the intended use of the animal enrichment tool 1. It should be noted, according to the invention, that the second head support section 34 is proportionally smaller than the first head support section 24.

Next, with reference to FIGS. 14-17, a first sensory head 40 according to the invention will be described.

In an exemplary embodiment, the first sensory head 40 is planar body of molded plastic having a triangular shape that corresponds with the shape of the first head support 28. In an exemplary embodiment of the invention, the first sensory head 40 is a thermoplastic elastomer fitted on the first head support section 24 and, more particularly, the first sensory head 40 is overmolded about the first head support 28. For instance, the first sensory head 40 may be formed from TPE having a hardness of approximately 80 durometer. However, one skilled in the art should appreciate that other materials with varying material properties may be used.

As shown, the first sensory head 40 according to the invention generally includes a first planar body 42 and a plurality of first sensory members 44. The first planar body 42 is formed about the first head support 28, and maintains substantially the same shape thereof. Each first sensory member 44 is an elongated members positioned on one side of the first planar body 42. As shown, the first sensory members 44 are arranged into a plurality of horizontally and vertically arranged rows and individually spaced apart.

In an exemplary embodiment, each first sensory member 44 extends away from the first planar body 42 and is independently resilient with respect to adjacent first sensory members 44. In the shown exemplary embodiment, each first sensory member 44 is a conical shaped finger like member. However, one skilled in the art should appreciate that other shaped may be suitable for the intended use of the animal enrichment tool 1.

Next, with reference to FIGS. 18-21, a second sensory head 50 according to the invention will be described.

In an exemplary embodiment, the second sensory head 50 is planar body of molded plastic having an oval shape that corresponds with the shape of the second head support 38. In an exemplary embodiment of the invention, the second sensory head 50 is a thermoplastic elastomer fitted on the second head support section 34 and, more particularly, the second sensory head 50 is overmolded about the second head support 38. For instance, the second sensory head 50 may be formed from TPE having a hardness of approximately 80 durometer. However, one skilled in the art should appreciate that other materials with varying material properties may be used.

As shown, the second sensory head 50 according to the invention generally includes a second planar body 52 and a plurality of second sensory members 54. The second planar body 52 is formed about the second head support 38, and maintains substantially the same shape thereof. Each second sensory member 54 is an elongated members positioned on one side of the second planar body 52. As shown, the second sensory members 54 are arranged into a plurality of horizontally and vertically arranged rows and individually spaced apart.

In an exemplary embodiment, each second sensory member 54 extends away from the second planar body 52 and is independently resilient to adjacent second sensory member 54. In the shown exemplary embodiment, each second sensory member 54 is a conical shaped finger like member. However, one skilled in the art should appreciate that other shaped may be suitable for the intended use of the animal enrichment tool 1. It should be noted, according to the invention, that the second sensory head 50 is proportionally smaller than the first sensory head 40.

With reference back to FIGS. 1 and 2, the animal enrichment tool 1 can be handled using either the first handle section 22 or the second handle section 32. A operator would grip the first handle section 22 to manipulate and position the second sensory head 50 about an animal. The operator would grip the second handle section 32 to manipulate and position the first sensory head 40 about the animal. The animal enrichment tool 1 allows the operator to apply gentle touching to an animal in order to calm and gain the animal's trust. This is accomplished by both the size and shape of the tool 1. For larger animals, the length is increased and the shape maybe further curved.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalent.

What is claimed is:

1. The animal enrichment tool, comprising:
   a s-shaped frame having a bridge section, a first end section extending from one end of the bridge section and having an arcuate shape that matches the shape of an end of the bridge section, and a second end section extending from another end of the bridge section, wherein the first end section is an elongated body having a first handle section and a first head support section and to which it extends, wherein the first handle section is elongated body having an arcuate shape and a plurality of grips;
   a first sensory head positioned at one end of the shaped frame;
   a second sensory head positioned at another end of the shaped frame;
   a first head support section;
   a first connector section extending from the first handle section of the first head support section;
   a first hanger receiving passageway extending there through; and
   a first head support section having a first planar surface facing upward, and angled to correspond with the curved profile of the of the first end section.

2. The animal enrichment tool according to claim 1, wherein the first head support is triangular shaped.

3. The animal enrichment tool according to claim 2, wherein the second end section is an elongated body having an arcuate shape that matches the shape of an end of the bridge section to which it extends.

4. The animal enrichment tool according to claim 3, wherein the second end section includes a second handle section and a second head support section.

5. The animal enrichment tool according to claim 4, wherein the second handle section is elongated body having an arcuate shape and a plurality of grips.

6. The animal enrichment tool according to claim 4, wherein the second head support section includes:
   a second connector section extending from the second handle section and having a second hanger receiving passageway extending there through; and
   a second head support having a second planar surface facing upward and angled to correspond with the curved profile of the of the second end section.

7. The animal enrichment tool according to claim 6, wherein the second head support is oval shaped.

8. The animal enrichment tool according to claim 7, wherein the first sensory head is a planar body of molded plastic having a triangular shape that corresponds with the shape of the first head support.

9. The animal enrichment tool according to claim 8, wherein the first sensory head is a thermoplastic elastomer fitted on the first head support section.

10. The animal enrichment tool according to claim 9, wherein the first sensory head includes a first planar body and a plurality of first sensory members, each first sensory member of the plurality of first sensory members is an elongated member positioned on one side of the first planar body and are independently resilient with respect to adjacent first sensory members.

11. The animal enrichment tool according to claim 10, wherein the second sensory head is a planar body of molded plastic having an oval shape that corresponds with the shape of the second head support.

12. The animal enrichment tool according to claim 11, wherein the second sensory head is a thermoplastic elastomer fitted on the second head support section.

13. The animal enrichment tool according to claim 12, wherein the second sensory head includes a second planar body and a plurality of second sensory members, each second sensory member of the plurality of second sensory members is an elongated member positioned on one side of the second planar body and are independently resilient with respect to adjacent second sensory members.

* * * * *